United States Patent
Aoyama et al.

[19]

[11] Patent Number: 6,083,138
[45] Date of Patent: Jul. 4, 2000

[54] HYBRID DRIVE CONTROL SYSTEM FOR VEHICLE

[75] Inventors: Shunichi Aoyama, Kanagawa; Shinichiro Kitada, Tokyo; Noboru Hattori, Kanagawa; Isaya Matsuo, Tokyo, all of Japan

[73] Assignee: Nissan Motor Co., Ltd., Yokohama, Japan

[21] Appl. No.: 09/262,119

[22] Filed: Mar. 4, 1999

[30] Foreign Application Priority Data

Mar. 20, 1998 [JP] Japan .................................. 10-072387

[51] Int. Cl.[7] .................................................. B60K 41/02

[52] U.S. Cl. ............................................ 477/5; 180/65.7

[58] Field of Search .................... 477/5, 15, 3; 180/65.2, 180/65.6, 65.7

[56] References Cited

U.S. PATENT DOCUMENTS

| | | | |
|---|---|---|---|
| 5,415,603 | 5/1995 | Tuzuki et al. | 477/5 |
| 5,833,022 | 11/1998 | Welke | 477/5 |
| 5,873,426 | 2/1999 | Tabata et al. | 477/2 X |

FOREIGN PATENT DOCUMENTS 5-50865  3/1993  Japan .

*Primary Examiner*—Sherry L. Estremsky
*Attorney, Agent, or Firm*—Foley & Lardner

[57] ABSTRACT

A hybrid vehicle propulsion system comprises an electric motor as a first propulsion source, an engine as a second propulsion source and a continuously variable transmission for receiving an input rotation from at least one of the motor and engine and for delivering a driving torque to a drive axle of the vehicle. A controller controls a transmission ratio of the transmission so that the transmission ratio in a motor drive mode is higher than the transmission ratio in an engine drive mode.

16 Claims, 13 Drawing Sheets

FIG.7

| OP. MODE | DRIVER'S INPUT SYSTEM | | | | STATE SYSTEM | | | | | | CONTROLLED SYSTEM | | | | FIG. |
|---|---|---|---|---|---|---|---|---|---|---|---|---|---|---|---|
| | KEY | LEVER | ACC. DEPRES- SION | BRAKE | VEHICLE SPEED | BATTERY TEMP. | BATTERY SOC | ENGINE REV | ENGINE FUEL | MOTOR 1 POWER GENERATION | CLUTCH | MOTOR 4 | TRANS- MISSION RATIO | MOTOR 10 | |
| 1 | ON | D | LIGHT | RELEASED | LOW | GOOD | GOOD/ TOO HIGH | STOP | CUT OFF | NON- GENERATE | DISENGAGED | OPERATIVE | UNDER CONTROL | OPERATIVE | 8 |
| | | | | | | | TOO LOW | REV | SUPPLY | GENERATE | HALF ENGAGED | IN- OPERATIVE | | | 9 |
| | | | | | | N.G. | | | | | | | | | 10 |
| 2 | | | | | MEDIUM | GOOD | GOOD/ TOO HIGH | STOP | CUT OFF | NON- GENERATE | DISENGAGED | OPERATIVE | | | 8 |
| | | | | | | | TOO LOW | REV | SUPPLY | GENERATE | ENGAGED | IN- OPERATIVE | | | 9 |
| | | | | | | N.G. | | | | | | | | | 10 |
| 3 | | | | | HIGH | GOOD | GOOD/ TOO HIGH | REV | SUPPLY | NON- GENERATE | ENGAGED | IN- OPERATIVE | | | 11 |
| | | | | | | | TOO LOW | | | GENERATE | | | | | 9 |
| | | | | | | N.G. | | | | | | | | | 10 |
| 4 | | | DEEP | RELEASED | LOW | GOOD | GOOD/ TOO HIGH | REV | SUPPLY | NON- GENERATE | HALF ENGAGED | OPERATIVE | | | 12 |
| | | | | | | | TOO LOW | | | GENERATE | | IN- OPERATIVE | | | 9 |
| | | | | | | N.G. | | | | | | | | | 10 |
| 5 | | | | | MEDIUM HIGH | GOOD | GOOD/ TOO HIGH | REV | SUPPLY | NON- GENERATE | ENGAGED | OPERATIVE | | | 12 |
| | | | | | | | TOO LOW | | | GENERATE | | IN- OPERATIVE | | | 9 |
| | | | | | | N.G. | | | | | | | | | 10 |

HYBRID DRIVE CONTROL SYSTEM FOR VEHICLE

BACKGROUND OF THE INVENTION

The present invention relates to drive control system and method for a hybrid vehicle having two propulsion sources.

A hybrid vehicle propelled by a combination of an internal combustion engine and an electric motor is disclosed in Japanese Patent Provisional (Kokai) Publication No. 5(1993)-50865.

SUMMARY OF THE INVENTION

In general, an engine decreases its maximum torque at low speeds whereas a motor can produce a maximum torque from a start from a stationary condition. A hybrid drive system normally employs a battery of a small capacity, as compared with a pure electric car (EV) which requires a large capacity battery. The hybrid drive system generates electric power with an engine-driven generator to drive the motor and to recharge the battery.

To efficiently utilize the stored energy of the relatively small capacity battery, the hybrid system switches the source of the driving force between the engine and the motor according to their properties. The hybrid system starts the vehicle with the driving force of the motor, and then propels the vehicle with the engine when the vehicle speed becomes high.

It is an object of the present invention to provide hybrid drive control system and method which can operate first and second propulsion sources under respective optimal conditions in a first propulsion source drive mode and a second propulsion source drive mode.

According to the present invention, a hybrid drive control system for a hybrid vehicle comprises a hybrid propulsion system and a controller. The hybrid propulsion system comprises a first propulsion source such as an electric motor, a second propulsion source such as an engine, and a transmission for receiving an input rotation from at least one of the first and second propulsion sources and delivering an output rotation to drive the vehicle. The controller makes a transmission ratio of the transmission higher in a first drive mode for propelling the vehicle with the first propulsion source than in a second drive mode for propelling the vehicle with the second propulsion source.

A hybrid drive control method according to the present invention comprises:
  operating a parallel hybrid propulsion system in one of a first operating mode for driving the vehicle mainly with the motor and a second operating mode for driving the vehicle mainly with the engine; and
  setting a transmission ratio of the transmission higher in the first operating mode than in the second operating mode.

BRIEF DESCRIPTION OF THE DRAWINGS

FIG. 7 is a table showing conditions of the input devices, the vehicle and controlled components in the control system shown in FIGS. 1 and 2.

DETAILED DESCRIPTION OF THE INVENTION

Figure 1:
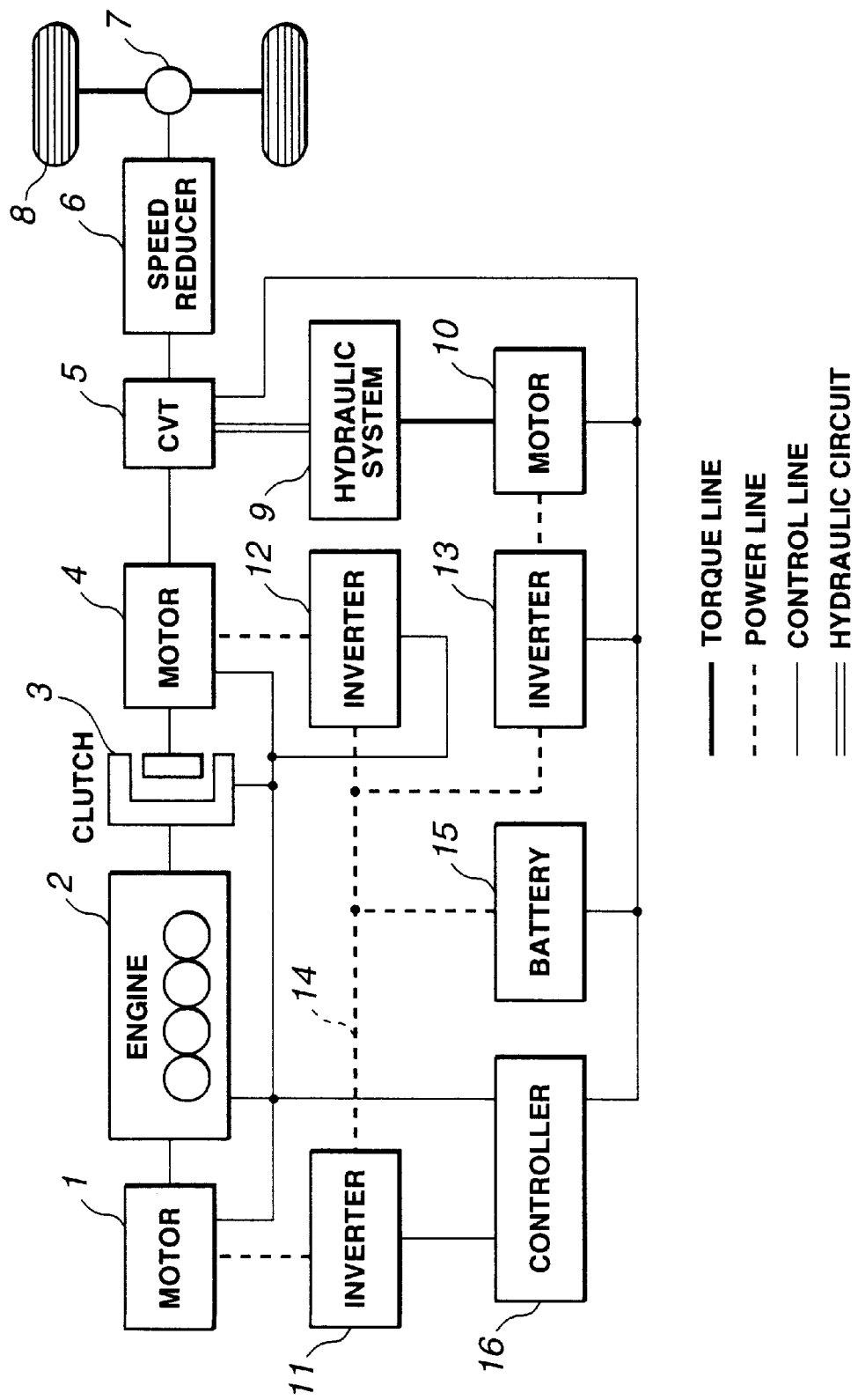
FIG. 1 is a schematic view showing a drive control system for a hybrid vehicle according to one embodiment of the present invention.

FIG. 1 shows a hybrid vehicle according to one embodiment of the present invention. In FIG. 1, a thick solid line indicates a transmission line of mechanical torque, a thick broken line indicates an electric power line, a thin solid line indicates a control line, and a double line indicates a hydraulic circuit.

A power train of the vehicle includes a first motor 1, an engine 2, a clutch 3, a second motor 4, a continuously variable transmission (CVT) 5, a speed reducer (or reduction gear) 6, a differential 7 and drive wheels 8.

The clutch 3 has an input shaft connected with an output shaft of the motor 1 and an output shaft of the engine 2, and an output shaft connected with an output shaft of the motor 4 and an input shaft of the continuously variable transmission 5.

When the clutch 3 is engaged, the engine 2 and the motor 4 can both function as a propulsion source of the vehicle. When the clutch 3 is disengaged, the motor 4 alone has the capability as the propulsion source. The driving force of the engine 2 and/or motor 4 is transmitted through the CVT 5, the speed reducer 6 and the differential 7 to the drive wheels 8. In this example, the CVT 5 is a belt type continuously variable transmission. A hydraulic system 9 supplies oil under pressure to the CVT 5 for clamping a belt of the CVT and for lubrication. A motor 10 drives an oil pump (not shown) in the hydraulic system 9.

The motor 1, 4 and 10 in this example are ac machines, such as three-phase synchronous motor or three-phase induction motor. The motor 1 is mainly used for starting the engine 2 and for generating electric power. The motor 4 is mainly used for propelling and braking the vehicle. The motor 10 is for driving the oil pump of the hydraulic system 9.

Instead of the ac motor drive design, it is optional to employ a dc motor drive system employing dc motors as the motors 1, 4 and 10. Furthermore, in the engaged state of the clutch 3, it is possible to use the motor 1 for vehicle propulsion and braking, and the motor 4 for engine starting and power generation.

The clutch 3 of this example is a powder clutch and the clutch 3 is capable of varying the torque transmitted through the clutch 3. It is optional to employ, as the clutch 3, a dry single plate clutch or a wet multiple disk clutch. The continuously variable transmission 5 is a variable speed or speed varying transmission capable of varying the transmission ratio (or gear ratio) in a stepless continuous manner. The continuously variable transmission 5 may be a toroidal type CVT instead of the belt type.

The motors 1, 4 and 10 are driven by inverters 11, 12 and 13, respectively. In the case of the dc motor option, dc/dc converters are used in place of the inverters 11, 12 and 13. The inverters 11, 12 and 13 are connected through a common dc link 14 with a main battery 15. The inverters 11, 12 and 13 change dc power of the main battery 15 into ac power, and supply the ac power to the motors 1, 4 and 10. Moreover, the inverters 11, 12 and 13 convert ac power generated by the motors 1 and 4 into dc power, and supplies the dc power to the main battery 15 for charging. Since the inverters 11, 12 and 13 are connected with one another by the dc link 14, this system can supply the power generated by a motor in regenerating operation to a motor in power running operation directly without the intervention of the main battery 15. As the main battery 15, it is possible to employ various batteries. Some examples are lithium-ion battery, nickel-hydrogen battery and lead battery (or lead-acid battery). Moreover, it is possible to employ, as the main battery 15, a power capacity such as an electric double layer capacitor.

Figure 2:
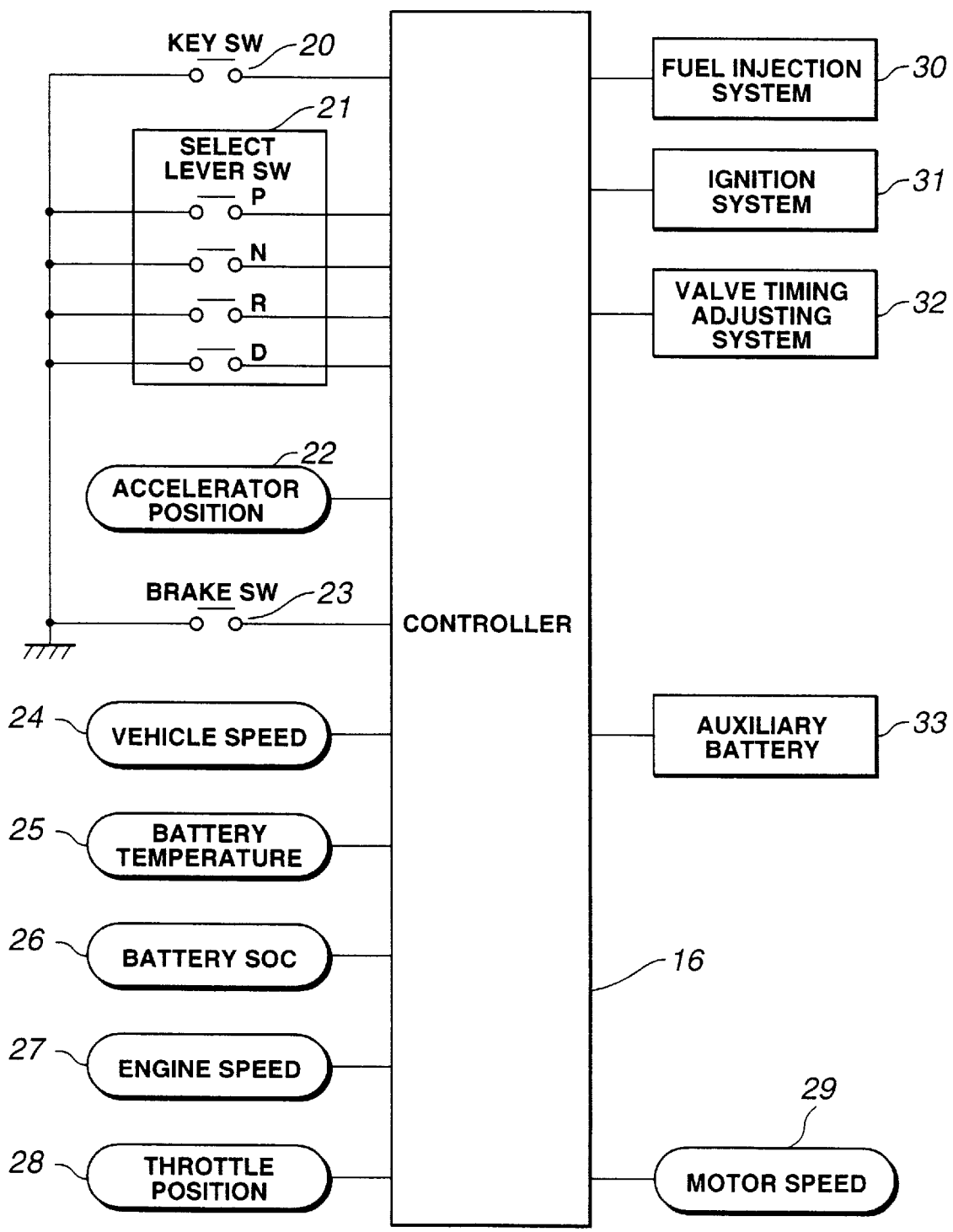
FIG. 2 is a schematic view showing input devices, a controller and output devices of the control system of FIG. 1.

The system shown in FIGS. 1 and 2 is a control system including a controlled system and a controlling system. A main component of the controlling system is a controller 16.

The controller 16 of this example comprises a microcomputer, its peripheral devices and various actuators. The controller 16 controls the revolution speed and torque of the engine 2, the transmission torque of the clutch 3, the revolution speed and torque of each of the motors 1, 4 and 10, and a transmission ratio of the continuously variable transmission 5.

As shown in FIG. 2, the controller 16 is connected with an input section for collecting various input information. The input section of the example shown in FIG. 2 includes a key switch 20, a select lever switch 21, an accelerator position sensor 22, a brake switch 23, a vehicle speed sensor 24, a battery temperature sensor 25, a battery SOC (state of charge) sensor 26, an engine revolution sensor 27, a throttle position sensor 28 and a motor revolution sensor 29.

The key switch 20 can sense a condition of a vehicle switch (such as an ignition switch). In this example, the key switch 20 is closed (or turned on) when the vehicle key is put at an on position or a start position. Otherwise, the key switch 20 is opened (or turned off). The select lever switch 21 serves as a sensing device for sensing a condition of a select lever or a condition of the transmission 15. The select lever switch 21 of this example includes P, N, R and D switches. One of these switches is turned on when a select lever is shifted by the driver to one of the parking position P, neutral position N, reverse position R and drive position D.

The accelerator position sensor 22 senses a driver's accelerator input which, in this example, is in the form of a depression degree (or accelerator opening degree) $\theta$ of an accelerator pedal of the vehicle. The brake switch 23 serves as a device for sensing a condition of a brake system of the vehicle. The brake switch 23 of this example responds to a depression of a brake pedal by producing an on signal. The vehicle speed sensor 24 senses a vehicle speed V of the vehicle. The battery temperature sensor 25 senses a temperature Tb of the main battery 15. The battery SOC sensor 26 is a sensing system for sensing the state of charge (SOC) of the main battery 15. The engine revolution sensor 27 serves as an engine speed sensor for sensing an engine speed Ne of the engine 2. The throttle position sensor 28 senses a throttle opening degree $\theta$th of a throttle valve for the engine 2. The motor revolution sensor 29 senses a motor speed Nm of the motor 4.

The controller 16 is further connected with an output section (or actuator section). The output section of the example shown in FIG. 2 includes a fuel injection system 30, an ignition system 31, a valve timing adjusting system 32. The controller 16 controls the fuel supply and cutoff, and the fuel injection quantity to the engine 2 by controlling the fuel injection system 30, and further controls the ignition operation of the engine 2 by controlling the ignition system 31. Moreover, the controller 16 adjusts the closing timing of each intake valve of the engine 2 by controlling the valve timing adjusting system 32. A low voltage auxiliary battery 33 serves as a power source for supplying power to the controller 16.

Figure 3:
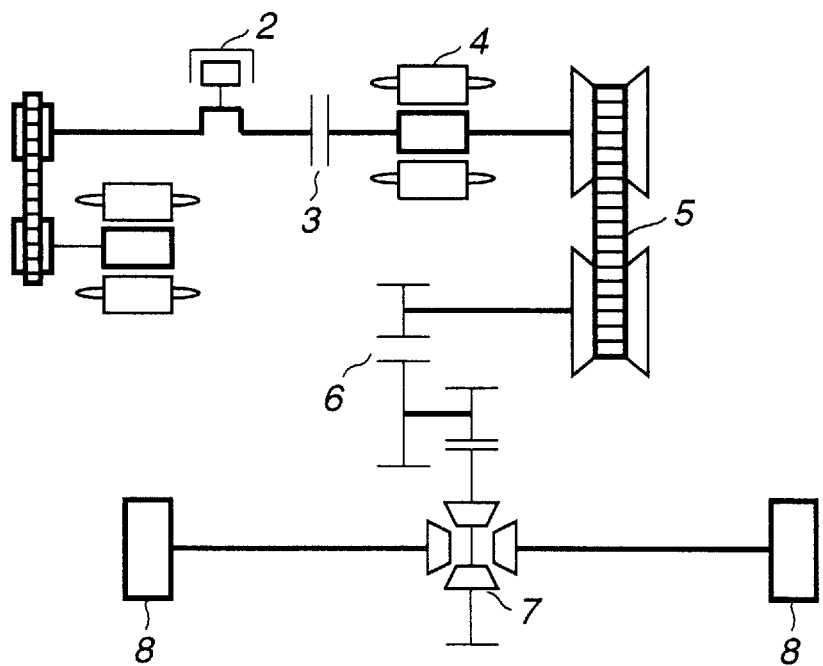
FIG. 3 is a schematic view showing a first hybrid drive configuration the embodiment of FIG. 1 employs.

FIG. 3 shows a hybrid powertrain configuration of the hybrid system of FIG. 1.

In the example of FIG. 3, the motor 1 on the input side of the clutch 3 is placed on the upstream side of the engine 2. The output shaft of the engine 2 is directly connected with the input shaft of the clutch 3 so as to form a single shaft, and the output shaft of the engine 2 is connected with the output shaft of the motor 1 by a belt drive or a gear system.

The motor 4 on the output side of the clutch 3 is placed on the upstream side of the CVT 5 in the example of FIG. 3. The output shaft of the clutch 3 is extended through a rotor of the motor 4 and connected directly with the input shaft of the CVT 5. The output side of the clutch 3 is a single shaft arrangement, and the motor 4 is connected with the input shaft of the CVT 5.

Figure 4:
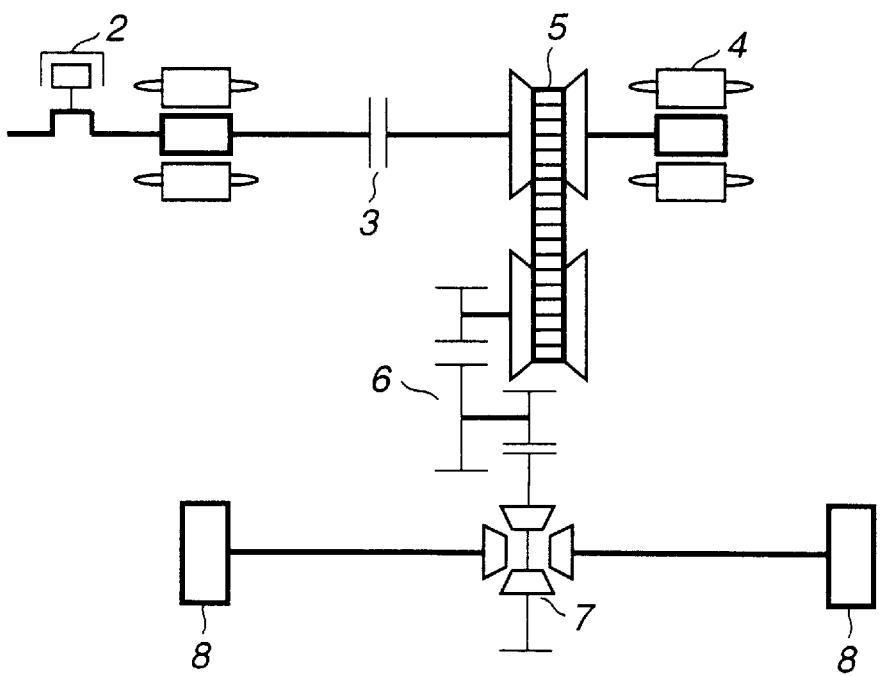
FIG. 4 is a schematic view showing a second hybrid drive configuration the embodiment of FIG. 1 can employ instead of the configuration of FIG. 3.

FIG. 4 shows another example the embodiment of FIG. 1 can employ instead of the configuration of FIG. 3. In the example of FIG. 4, the motor 1 is placed on the downstream side of the engine 2, and the output shaft of the engine 2 is extended through a rotor of the motor 1, and connected directly with the input shaft of the clutch 3 so that the input side of the clutch 3 is a single shaft arrangement. The motor 4 is placed on the downstream side of the CVT 5. In the arrangement of FIG. 4, the output shaft of the clutch 3 is extended through the input shaft of the CVT 5 and connected directly with the output shaft of the motor 4. The output side of the clutch 3 is a single shaft arrangement, and the motor 4 is connected with the input shaft of the CVT 5, like the configuration of FIG. 3.

The present invention is not limited to the configurations of FIGS. 3 and 4, but applicable to various other configurations. The components shown in FIGS. 3 and 4 may be arranged in different manners. Preferably, the engine 2 and the motor 1 are connected with the input member of the clutch 3, the output member of the clutch 3 is connected with the motor 4 and the input member of the CVT 5, and the output shaft of the CVT 5 is drivingly connected, through the reduction gear 6 and the differential 7, to the driving wheels 8.

Figure 5:
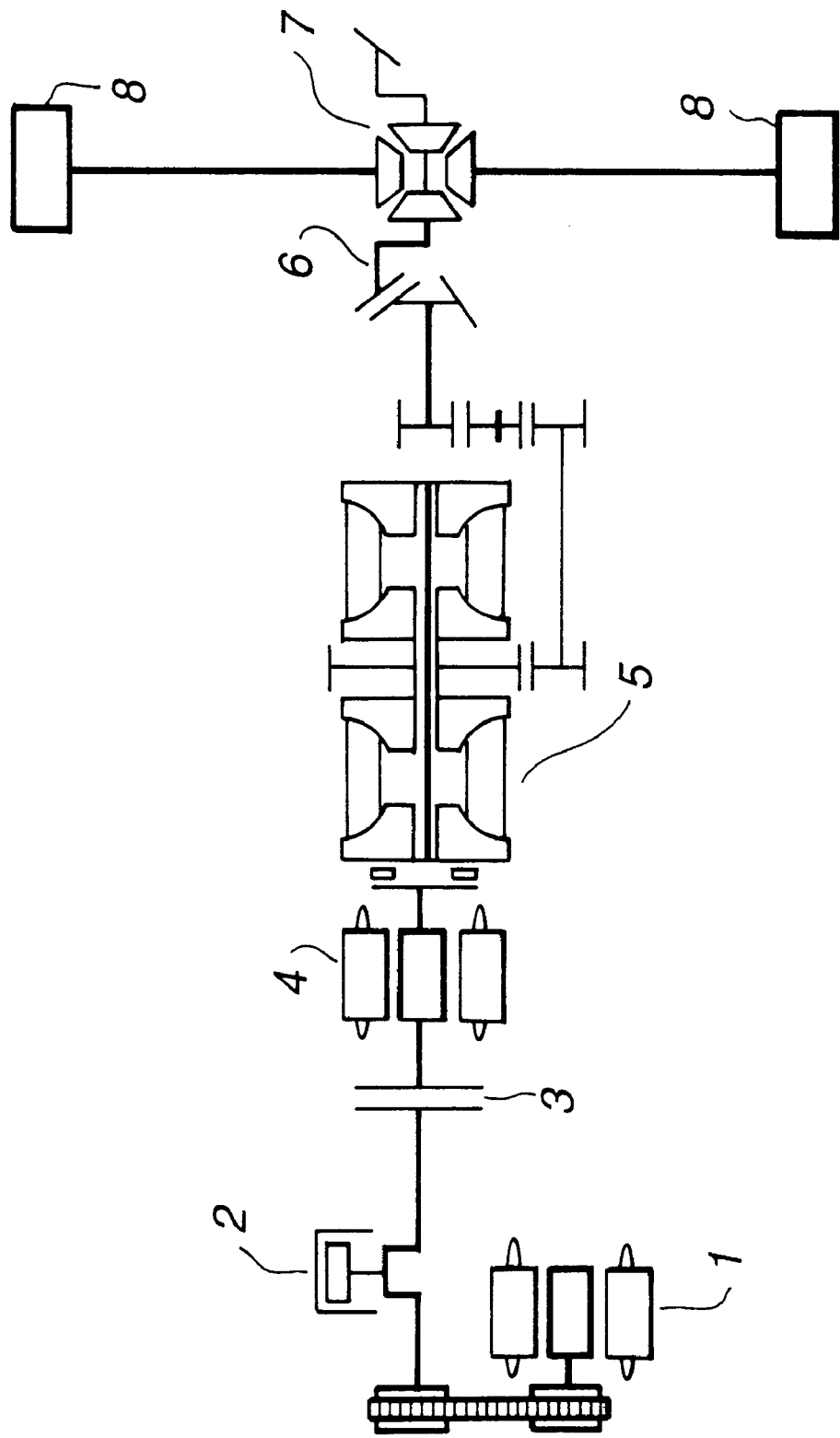
FIG. 5 is a schematic view showing a third hybrid drive configuration the embodiment of FIG. 1 can employ instead of the configuration of FIG. 3.

FIG. 5 shows still another example which employs the toroidal type CVT as the transmission 5. In this case, too, it is possible to place the motor 4 between the clutch 3 and the toroidal CVT 5 as shown in FIG. 5, or alternatively to place the toroidal CVT 5 between the clutch 3 and the motor 4 like the configuration of FIG. 4. In either case, the motor 4 is connected with the input shaft of the CVT 5.

Figure 6:
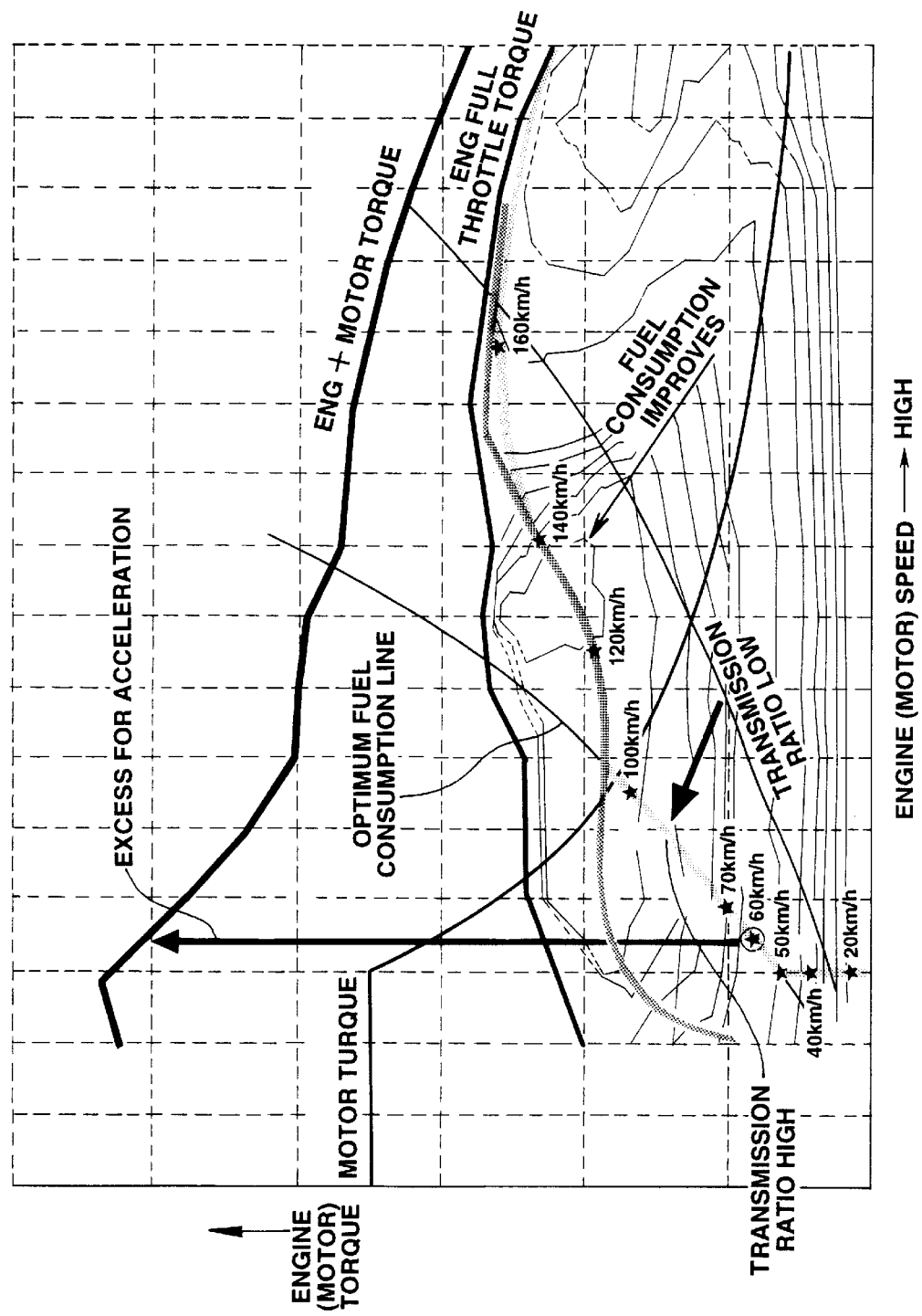
FIG. 6 is a graph showing torque speed characteristics of engine and motor which can be used in the embodiment of FIG. 1.

FIG. 6 shows torque-speed characteristics of the engine 2 and motor 4. Each characteristic is a relationship of the torque of the engine 2 or motor 4 with respect to the speed Ne or Nm (rpm) of the engine 2 or motor 4.

As shown by a curve "ENG FULL THROTTLE TORQUE", the torque of the engine 2 is approximately constant irrespective of variation of the speed. In a low speed region, the torque decreases steeply, and therefore a conventional engine system generally makes the transmission ratio of the transmission higher so that the engine is operated in a high speed region.

The motor 4 has a constant torque region and a constant output region as shown by a curve "MOTOR TORQUE". In the constant torque region from zero to a predetermined base speed, the control system can use the motor 4 fully to a rated torque. In the constant output region from the base speed to a top speed (maximum speed), the control system can use the motor 4 within a range of rated output by decreasing the torque as the speed increases.

In consideration of the ratings and characteristics of the engine 2 and motor 4, the control system according to this embodiment selectively employs a motor drive mode for driving the vehicle with the driving force of the motor 4 by disengaging the clutch 3, and an engine drive mode for driving the vehicle with the driving force of the engine 2 by engaging the clutch 3. A basic strategy is to use the motor drive mode at low speed or light load condition, and to choose the engine drive mode at high speed or high load condition. Accordingly, the control system uses the motor drive mode for starting movement of the vehicle from a dead stop and for accelerating the vehicle from low speeds, and switches the vehicle drive mode to the engine drive mode when the vehicle speed or load becomes high. When, however, the driver demands hard acceleration by depressing the accelerator pedal deep, the control system starts the engine 2 and half engages the clutch 3, and thereby starts or accelerates the vehicle with the driving forces of both the engine 2 and motor 4. When the vehicle speed exceeds a predetermined level, the control system stops the operation of the motor 4 and switches the vehicle drive mode to the engine drive mode. When the accelerator depression degree θ is large, the control system accelerates the vehicle by adding the driving force of the motor 4 to the driving force of the engine 2 even after the engagement of the clutch 3. In this case, the motor 4 functions to assist the engine 2 and the vehicle is driven mainly by the driving force of the engine 2, so that this operating mode is regarded as being included in the engine drive mode.

FIG. 7 shows input conditions, operating conditions and controlled conditions according to this embodiment. FIGS. 8~12 show various operating states of the components of the hybrid powertrain.

The conditions listed in FIG. 7 are classified into a driver's input system, a vehicle state system and a controlled system. In FIG. 7, a hyphen "-" means that any condition is allowable. In the driver's input system, "KEY" indicates the on or off state of the key switch 20, "LEVER" the P, N, R or D position of the select lever sensed by the select lever switch 21, "ACC." the released or depressed condition and the degree of the depression (whether lightly depressed or deeply depressed) of the accelerator pedal sensed by the accelerator sensor 22, "BRAKE" the released or depressed condition of the brake pedal sensed by the brake switch 23.

In the state system, "VEHICLE SPEED" is the vehicle speed V sensed by the vehicle speed sensor 24. The vehicle speed is "LOW" when the vehicle speed V is lower than a predetermined first speed V1 (V<V1), "MEDIUM" when the vehicle speed V is equal to or higher than the first speed V1 and equal to or lower than a second predetermined speed V2 (V1≦V≦V2), and "HIGH" when the vehicle speed V is higher than the second speed V2 (V>V2).

"BATTERY TEMP." indicates the temperature Tb of the main battery 15 sensed by the battery temperature sensor 25. The battery temperature Tb is "GOOD" when the battery temperature Tb is within a predetermined normal range (Tb1≦Tb≦Tb2), "N.G." (no good) when the battery temperature Tb is outside the normal range (Tb<Tb1 or Tb>Tb2). At the N.G. battery temperature condition, the charging ability and discharging ability of the battery are so low that the continuation of charging or discharging operation adversely affects the performance and lifetime of the battery. Therefore, this system does not perform the charging and discharging operations of the battery at the N.G. battery temperature condition.

"BATTERY SOC" indicates the state of charge sensed by the battery SOC sensing system 26. The SOC condition of the main battery 15 is "GOOD" when the sensed SOC is within a predetermined normal range (SOC1≦SOC≦SOC2), "TOO LOW" when the sensed SOC is lower than a predetermined first level SOC1, and "TOO HIGH" when the sensed SOC is higher than a predetermined second level SOC2. The too-low SOC condition is a condition in which the discharging ability of the battery is low, and the discharging operation at the too-low SOC condition affects the performance and life of the battery 15. The control system inhibits the discharging operation when the too-low SOC condition is detected. The too-high SOC condition is a condition in which the charging ability of the battery is low, and the continuation of the charging operation at the too-high SOC condition affects the performance and life duration of the battery.

"ENGINE REV" indicates an engine revolving condition determined by the revolution speed Ne of the engine 2 which in turn is sensed by the/engine revolution sensor 27. The engine revolution condition is "REV" when the engine speed Ne is equal to or higher than a predetermined first speed Ne1 (Ne≧Ne1, Ne1≈0), and "STOP" when the engine speed Ne is lower than the predetermined speed Ne1. In the engine REV condition, the engine 2 may be revolving by its own power by receiving fuel supply, or may be revolving merely by being driven by the drive system.

In each view of FIGS. 8~12, thick solid lines show active components and active torque, power or control lines.

(1) First Operating Mode (Light Accelerator Depression, Low Speed Mode)

Figure 8:
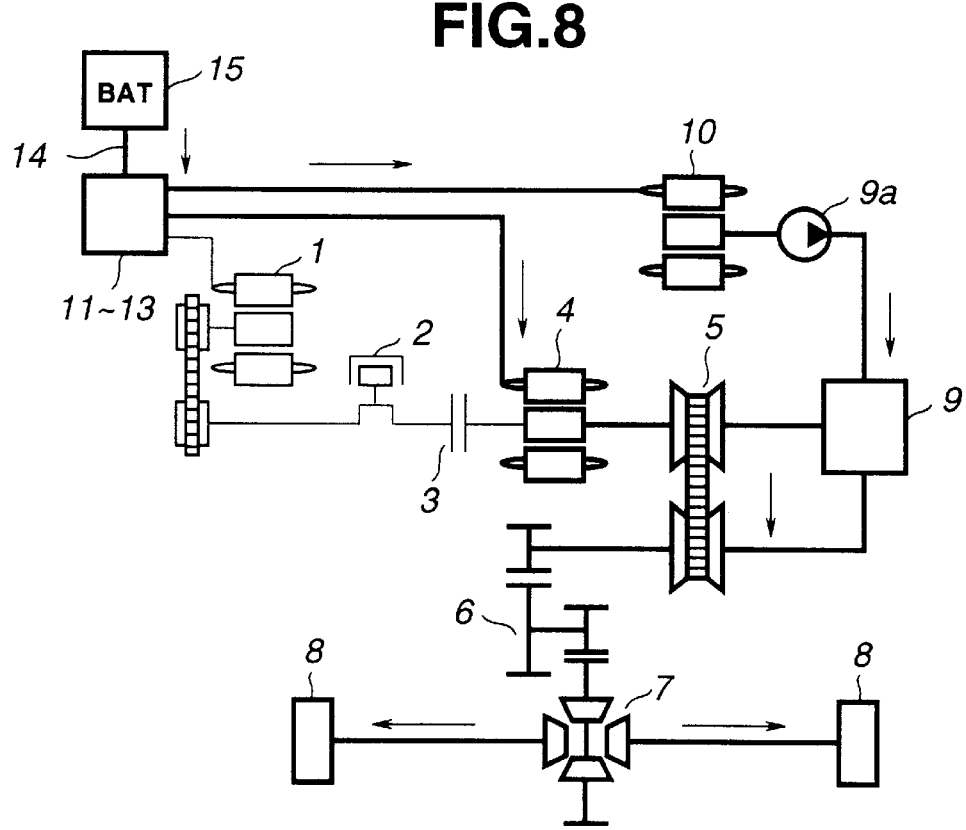
FIG. 8 is a schematic view showing the hybrid power train of the type shown in FIG. 3 in an operating state.

When the key switch 20 is in the on position, the select lever is in the D position, the accelerator pedal is depressed slightly (the accelerator depression degree θ is smaller than a predetermined value θ1; θ<1), and the vehicle speed is zero or low, the control system disengages the clutch 3, operates the motor 4 to produce the driving torque and starts or accelerates the vehicle, as shown in FIG. 8. During this, the control system adjusts the torque of the motor 4 in accordance with the accelerator depression degree θ and the vehicle speed V. The torque of the motor 4 is increased as the accelerator depression degree θ increases, and the output torque of the motor 4 is decreased as the vehicle speed V increases.

Figure 9:
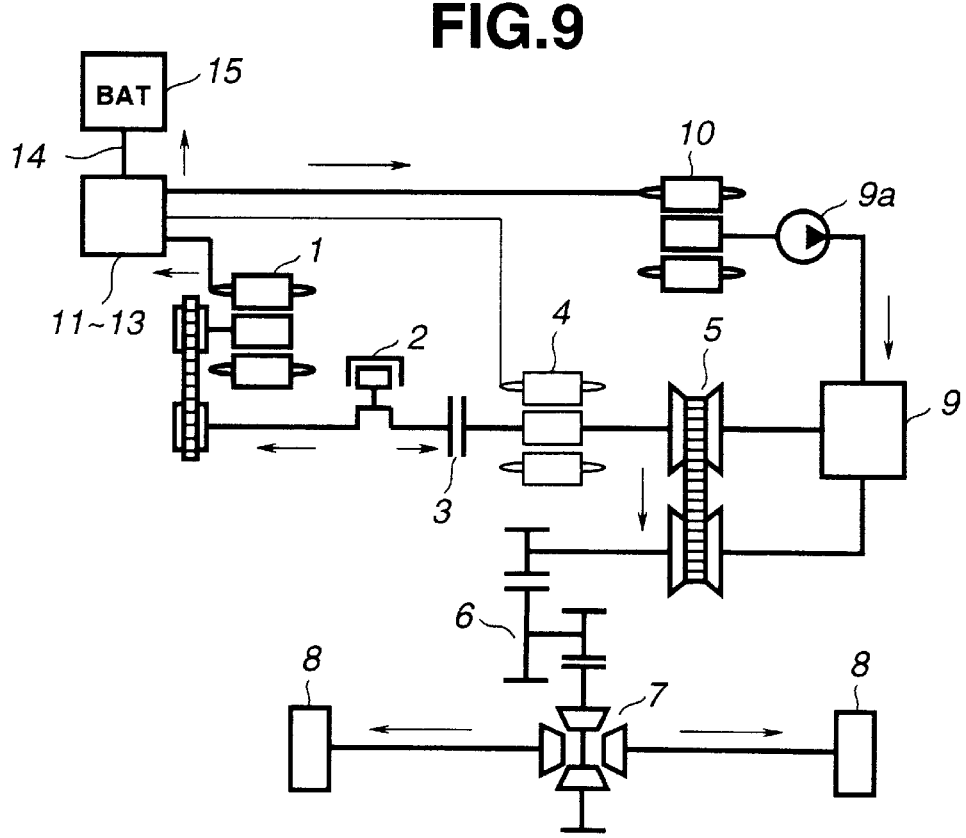
FIG. 9 is a schematic view showing the hybrid power train of the type shown in FIG. 3 in another operating state.

If, in this operating mode, the SOC of the main battery 15 becomes too low, the control system renders the motor 4 inoperative, supplies the fuel to the engine 2 to operate the engine 2, and engages the clutch 3 half slippingly to start or accelerate the vehicle, as shown in FIG. 9. Moreover, the motor 1 is operated as a generator, and supplies power to the main battery 15 and the oil pump motor 10. In the case of the clutch 3 being a powder clutch, the transmission torque of the clutch is proportional to the magnetizing current, so that the control system can control the transmission torque by controlling the magnetizing current to achieve a half engaging condition of the clutch.

Figure 10:
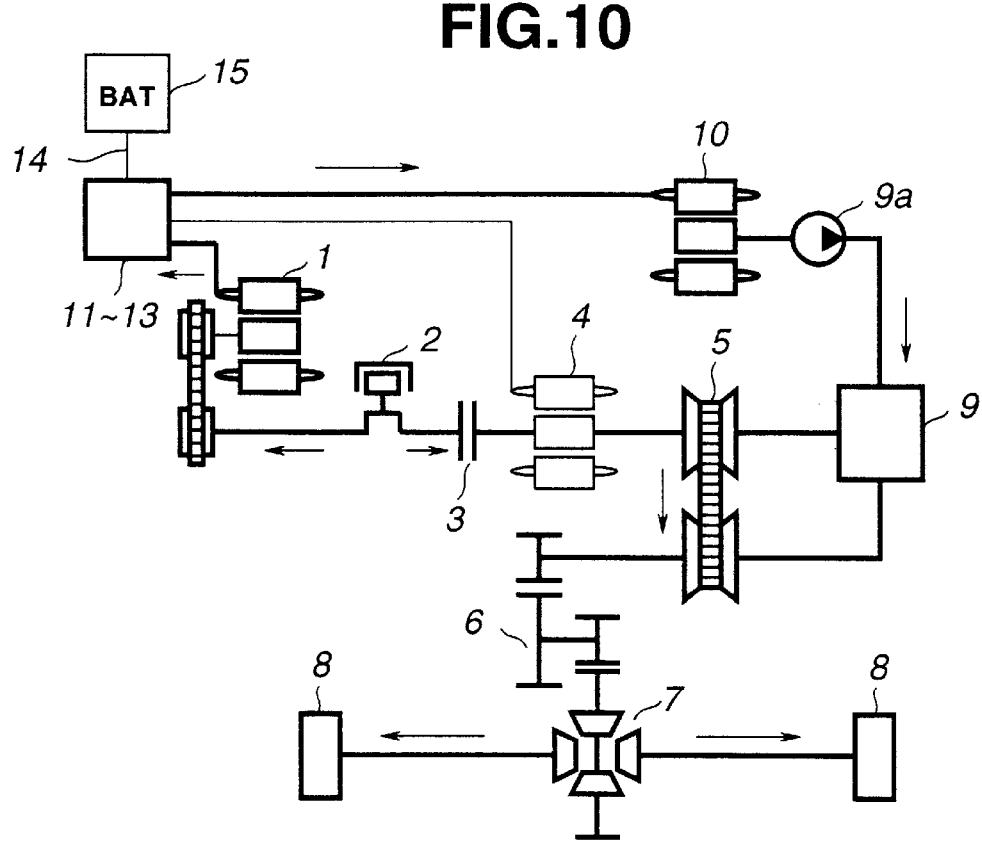
FIG. 10 is a schematic view showing the hybrid power train of the type shown in FIG. 3 in another operating state.

If, in this operating mode, the main battery 15 falls in the inadequate N.G. temperature state, the control system renders the motor 4 inoperative, supplies the fuel to the engine 2 to operate the engine 2, engages the clutch 3 slippingly to start or accelerate the vehicle, and operates the motor 1 as a generator to supply power to the oil pump motor 10, as shown in FIG. 10.

(2) Second Operating Mode (Light Accelerator Depression, Medium Speed Mode)

When the vehicle speed reaches a medium vehicle speed region in the state in which the select lever is in the D position and the accelerator pedal is depressed lightly, the control system, as shown in FIG. 8, releases the clutch 3, and operates the motor 4 to produce the driving force. If, however, the main battery 15 falls in the too-low SOC state, the control system, as shown in FIG. 9, renders the motor 4 inoperative, instead operates the engine 2 by supplying the fuel, and engages the clutch 3 to drive the vehicle with the driving force of the engine 2. Moreover, the control system operates the motor 1 as a generator and supplies the generated power to the main battery 15 and the oil pump motor 10. In case of the N.G. temperature state of the main battery 15, the control system renders the motor 4 inoperative, drives the vehicle with the engine 2 by engaging the clutch 3, and causes the motor 1 to generate and supply power to the oil pump motor 10, as shown in FIG. 10.

(3) Third Operating Mode (Light Accelerator Depression, High Speed Mode)

Figure 11:
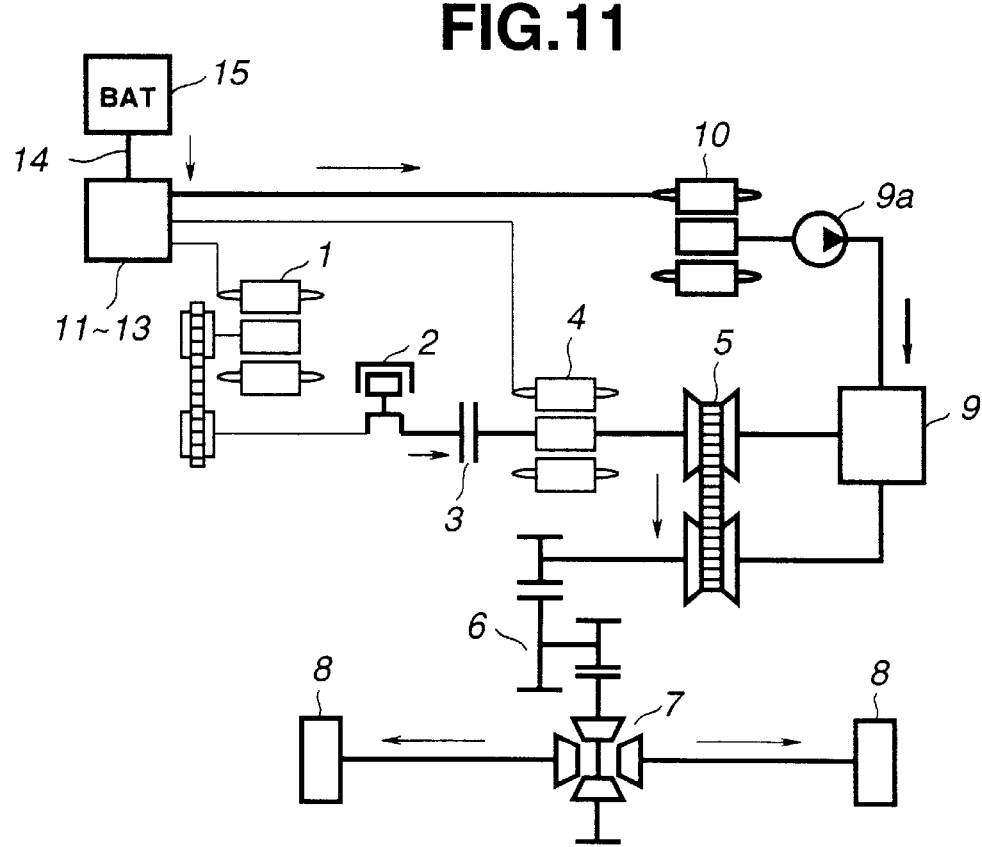
FIG. 11 is a schematic view showing the hybrid power train of the type shown in FIG. 3 in another operating state.

When the vehicle speed becomes high in the state in which the select lever is in the D position and the accelerator pedal is depressed slightly, then the control system drives the vehicle with the driving force of the engine 2 by holding the motor 4 inoperative, engaging the clutch 3 and supplying the fuel to the engine 2, as shown in FIG. 11. In this case, the control system does not perform the power generation by the motor 1. In case of the too low SOC state of the main battery 15, the control system performs the power generation of the motor 1 and supply the generated power to the main battery 15 and the oil pump motor 10, as shown in FIG. 9. In case of the inappropriate N.G. temperature state of the main battery 15, the control system causes the motor 1 to generate power and supply the generated power to the oil pump motor 10, as shown in FIG. 10.

(4) Fourth Operating Mode (Deep Accelerator Depression, Low Speed Mode)

When, in the state in which the key switch 20 is in the on position and the select lever is in the D position, the accelerator pedal is depressed so deep that depression degree θ is equal to or greater than the predetermined value θ1, and the vehicle speed is zero or lower than the predetermined speed, then the control system operates the engine 2 by fuel supply, puts the clutch 3 in the half engaged state and operates the motor 4. By so doing, the control system starts or accelerates the vehicle with the driving forces of the engine 2 and the motor 4 both. During this, the control system varies the output torque of the motor 4 in accordance with the accelerator depression degree θ and the vehicle speed V. Namely, the control system increases the motor output torque with increase in the accelerator depression degree θ and decreases the motor output torque with increase in the vehicle speed V.

If, in the fourth operating mode, the SOC of the main battery 15 becomes too low, the control system starts or accelerates the vehicle with the driving force of the engine alone by rendering the motor 4 inoperative, as shown in FIG. 9. Moreover, the control system operates the motor 1 as a generator, and supplies the generated power to the oil pump motor 10 and the main battery 15.

If, in the fourth operating mode, the main battery 15 falls in the inadequate temperature state, the control system starts or accelerates the vehicle with the driving force of the engine 2 alone with the motor 4 inoperative, the engine 2 in the fuel supply state, the clutch 3 engaged slippingly, and operates the motor 1 as a generator to supply power to the oil pump motor 10, as shown in FIG. 10.

(5) Fifth Operating Mode (Deep Accelerator Depression, Medium and High Speed Mode)

Figure 12:
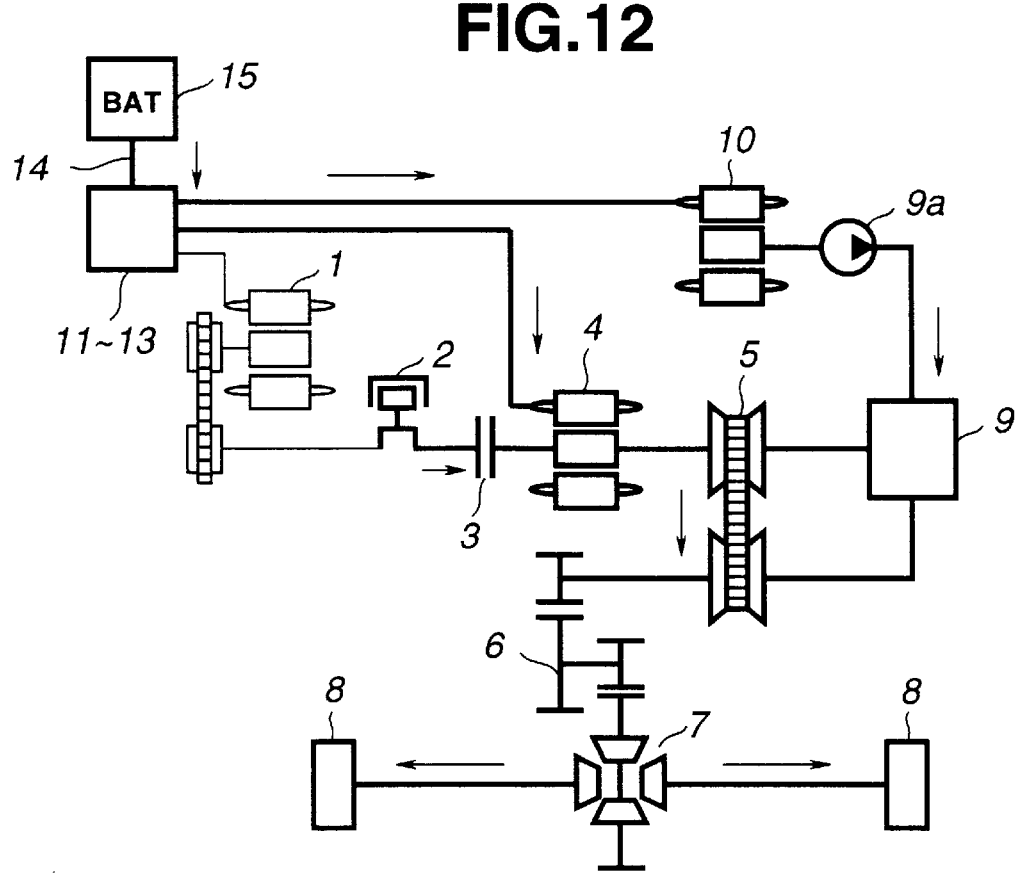
FIG. 12 is a schematic view showing the hybrid power train of the type shown in FIG. 3 in another operating state.

When the vehicle speed becomes medium or high in the state in which the select lever is in the D position and the accelerator pedal is depressed deep, the control system continues driving the vehicle with both of the driving forces of the engine 2 and the motor 4 by supplying the fuel to the engine 2, operating the motor 4, and engaging the clutch 3, as shown in FIG. 12. In this case, the control system increases the output torque of the motor 4 as the accelerator depression degree θ increases, and decreases the output torque of the motor 4 as the vehicle speed V decreases. In case of occurrence of the too-low SOC state of the main battery 15, the control system drives the vehicle with the driving force of the engine 2 alone by making the motor 4 inoperative, and operates the motor 1 as a generator and supply the power to the main battery 15 and the oil pump motor 10, as shown in FIG. 9. In case of the inappropriate temperature state of the main battery 15, the control system drives the vehicle with the driving force of the engine 2 by making the motor 4 inoperative and causes the motor 1 to generate power and supply the generated power to the oil pump motor 10, as shown in FIG. 10.

Figure 13:
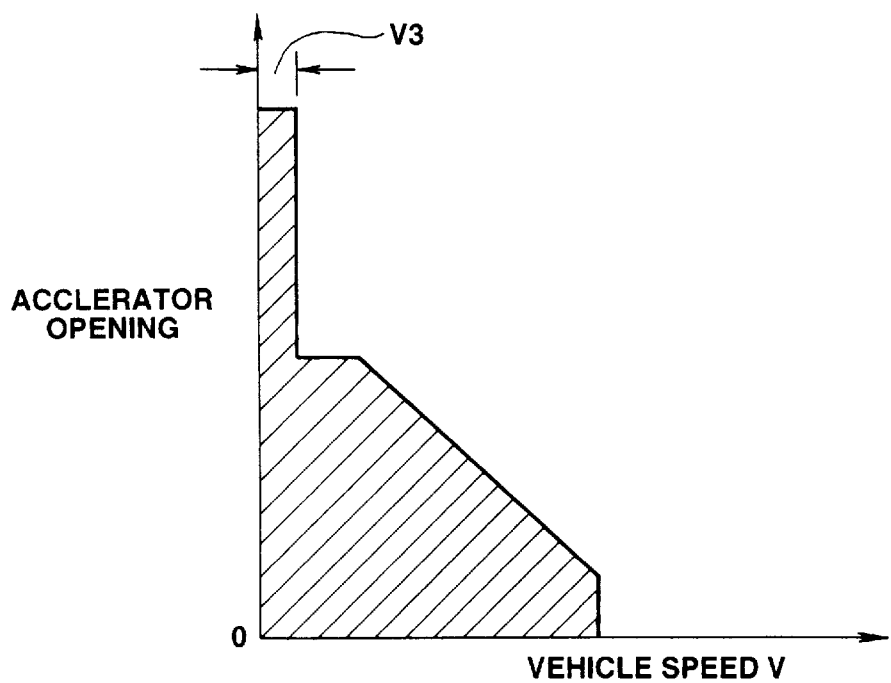
FIG. 13 is a graph showing a map for clutch engagement used in the control system shown in FIGS. 1 and 2.

FIG. 13 shows a map for clutch engagement.

The control system of this example decides whether to engage the clutch 3, by monitoring the accelerator pedal depression degree θ and the vehicle speed V. In FIG. 13, a hatching region is a region of the clutch disengagement, and a blank region is a region for the clutch engagement. When an operating point (or intersection) determined by the accelerator depression degree θ and the vehicle speed V moves from the hatching region to the blank region, the clutch 3 is engaged. However, in a low speed region wherein the vehicle speed V is lower than a predetermined speed V3, the control system drives the vehicle with the driving force of the motor 4 alone notwithstanding increase in the accelerator depression degree θ corresponding to the required driving force because the engine speed becomes low and the fuel efficiency and emission control performance tend to become poor in the low speed region. The predetermined vehicle speed V3 is set equal to a vehicle speed value obtained when the engine speed is 200~300 rpm.

Figure 14:
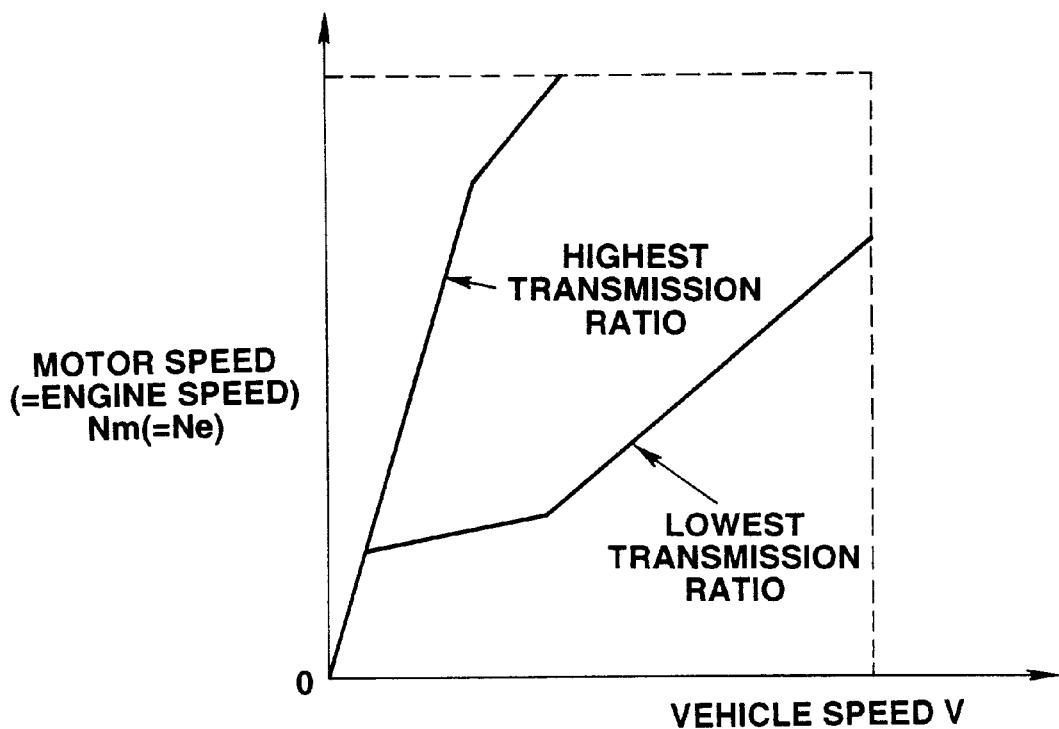
FIG. 14 is a graph showing a CVT shift map which can be used in the control system of FIG. 1.

FIG. 14 shows a shift map for the CVT 5.

The control system according to this embodiment controls the transmission ratio of the CVT 5 so that a transmission ratio ioff in the motor drive mode before clutch engagement is greater than a transmission ratio ion in the engine drive mode after clutch engagement. That is;

[Math Expression 1]

$$ioff > ion$$

The transmission ratio i is an input/output speed ratio of an input speed to an output speed. In this example, the transmission ratio i is the speed ratio of the revolution speed Nin of the input shaft of the CVT 5 to the revolution speed Nout of the output shaft of the CVT 5.

[Math Expression 2]

$$i = Nin/Nout$$

By using the revolution speed Nv of the drive axle of the vehicle, the motor speed Nm of the motor 4 and the engine speed Ne of the engine 2, the motor drive mode transmission ratio ioff and the engine drive mode transmission ratio ion correspond, respectively, to (Nm/Nv)off (=ioff) and (Ne/Nv)on (=ion), and the relationship of the math expression 1 is rewritten as;

[Math Expression 3]

$$(Nm/Nv)off > (Ne/Nv)on$$

Figure 15:
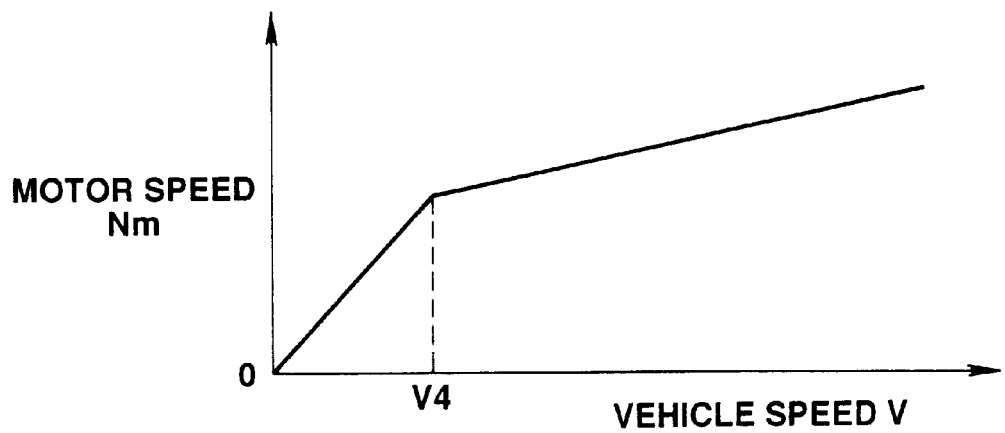
FIG. 15 is a graph showing a motor speed versus vehicle speed characteristic under a CVT transmission ratio control of the control system of FIG. 1.

When the transmission ratio is controlled in the above-mentioned manner, the motor speed Nm of the motor 4 is increased in accordance with the vehicle speed V as shown in FIG. 15. The transmission ratio is set high until the clutch 3 is engaged, and then the transmission ratio is made lower after the clutch 3 is engaged at a vehicle speed V4. Therefore, the rate of increase of the motor speed Nm with respect to the vehicle speed V is relatively high below V4. When the vehicle speed V exceeds the speed value V4, the rate of increase of the motor speed Nm with respect to the vehicle speed V is decreased to a lower value. In the example of FIG. 15, the line segments below and above V4 are both straight and the rate of increase of the motor speed Nm is changed abruptly at the clutch engaging vehicle speed V4. In practice, it takes time to vary the speed ratio of the CVT 5, so that the rate of increase of the motor speed Nm is varied smoothly after the vehicle speed V exceeds the speed level V4. Furthermore, in order to sufficiently increase the driving force of the engine 2 for a short period of time after the clutch engagement, the control system varies the transmission ratio of the CVT 5 gradually to the engine drive mode speed ratio ion, instead of immediately changing the transmission ratio to the engine drive mode ratio ion after the clutch engagement.

The speed ratio control according to this embodiment offers the following effects.

(1) Effect of the Higher Transmission Ratio ioff In the Motor Drive Mode:

The motor 4 supplies its driving force in starting and acceleration from a low speed. The higher transmission ratio ioff functions to increase the torque of the motor 4 provided on the input side of the transmission 5, so that the drive system can obtain a greater accelerating force from the motor 4 of a smaller capacity.

Figure 16:
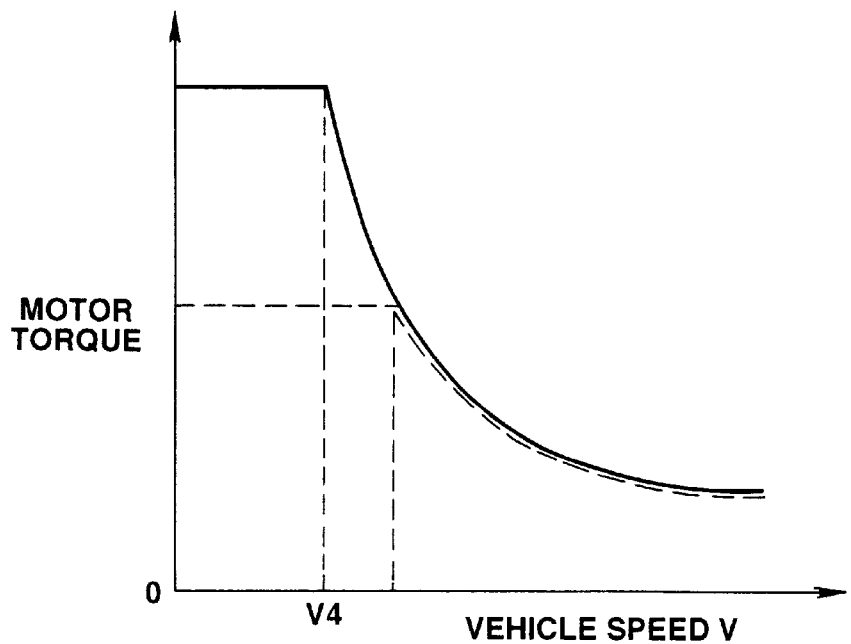
FIG. 16 is a graph showing a motor torque versus vehicle speed characteristic in the control system of FIG. 1.

FIG. 16 shows the torque (Te*ioff) of the motor 4 in terms of the torque of the output shaft of the CVT 5. A broken line shows the output torque obtained when the transmission ratio ioff is lower. A solid line shows the output torque when the transmission ratio ioff is higher.

With the higher transmission ratio in the clutch disengagement state, the control system can obtain a greater driving force by a smaller capacity motor in the low speed region, and thereby enables the size reduction and cost reduction of the powertrain.

Moreover, the normal revolution speed range of the motor 4 is shifted toward the higher speed side by the increase of the motor drive mode transmission ratio ioff in the clutch disengagement state, so that the control system can operate the motor 4 in the most efficient region.

Figure 17:
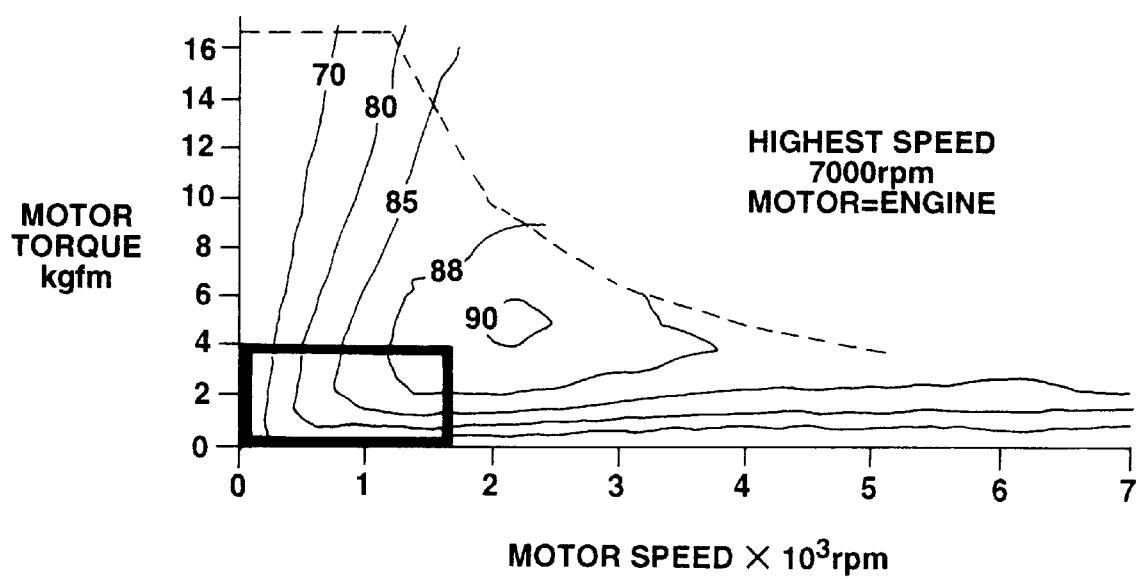
FIG. 17 is a graph showing an efficiency of a motor directly connected with an input shaft of a transmission.
Figure 18:
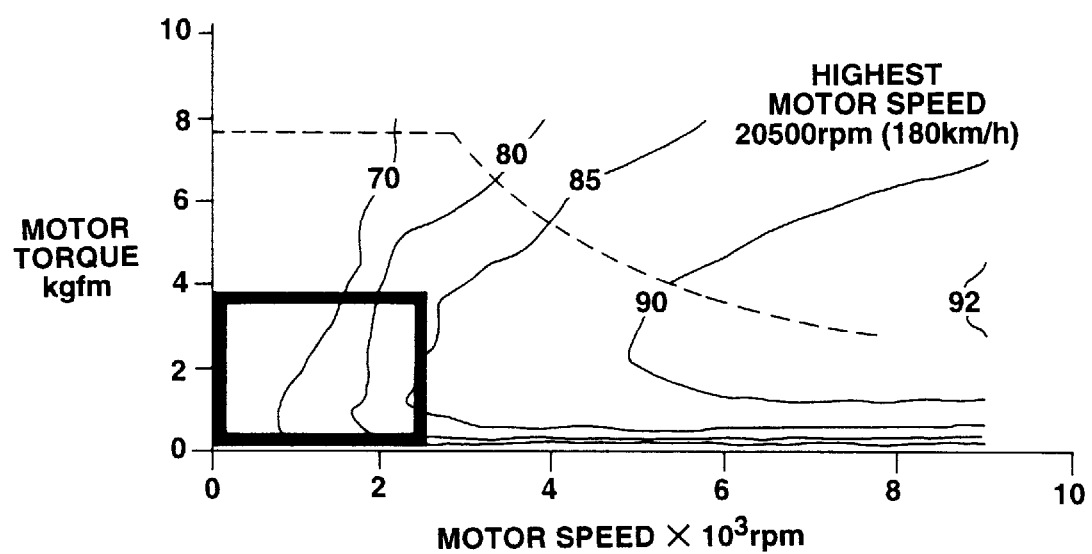
FIG. 18 is a graph showing an efficiency of a motor directly connected with an output shaft of a transmission.

FIG. 17 shows an operation efficiency of a motor connected with an input shaft of a transmission, and FIG. 18 shows an operation efficiency of a motor connected with an output shaft of a transmission. In these figures, the efficiency is expressed by numerical values, and a black frame shows an operating region used in 10–15 mode operations.

In the case of the connection with the transmission output shaft, the highest motor speed is increased in accordance with the highest vehicle speed, and accordingly, the efficient region of the motor is distributed on the high speed side, as shown in FIG. 18. As a result, the motor efficiency is low in the normally used low speed region.

In the case of the connection of the motor with the input shaft of the transmission, by contrast, the speed range is expanded by the transmission, and the highest motor speed is decreased, so that the efficient region of the motor can be distributed on the low speed side. Consequently, the motor efficiency is improved in the normal low speed region. Moreover, with a higher transmission ratio in normal operation, the normal operating range is shifted to a relatively high region, so that the drive system can operate the motor near the optimum point and improve the average motor efficiency.

Furthermore, the drive system can increase the engine output immediately after clutch engagement by increasing the motor drive mode transmission ratio ioff used before the clutch engagement. The transmission ratio at the vehicle speed immediately after the clutch engagement is close to the high transmission ratio of the motor drive mode. Therefore, the engine output is increased largely and the vehicle can obtain a great accelerating force.

The clutch is engaged in the state in which the transmission ratio is high. Therefore, the drive system can crank the engine 2 at a higher cranking speed, so that the negative pressure in the intake pipe can develop rapidly, and help avoid torque shock in the clutch engagement. The buildup of the negative pressure promotes the atomization and vaporization of the fuel, and facilitate an instant engine start while avoiding an increase of harmful emission (such as HC) due to a wall surface flow of the fuel.

(2) Effect of the Lower Transmission Ratio ion In the Engine Drive Mode After Clutch Engagement:

The drive control system can operate the engine under the low speed and high load condition and thereby improve the operating efficiency. Moreover, the drive control system can lower the highest speed of the motor 4 rotated by the engine 2 to the advantage of the cost of the motor 4.

During deceleration in the engine drive mode, the lower transmission ratio ion causes a decrease in the speed of the engine 2 driven by the load, so that the system can reduce the pumping loss of the engine 2, increase the amount of energy regeneration by the motor accordingly, and improve the fuel consumption.

Notwithstanding the low transmission ratio ion in the engine drive mode, the drive control system according to the embodiment can maintain the good driving performance by obtaining assistance in the drive force from the motor 4 according to the need.

Figure 19:
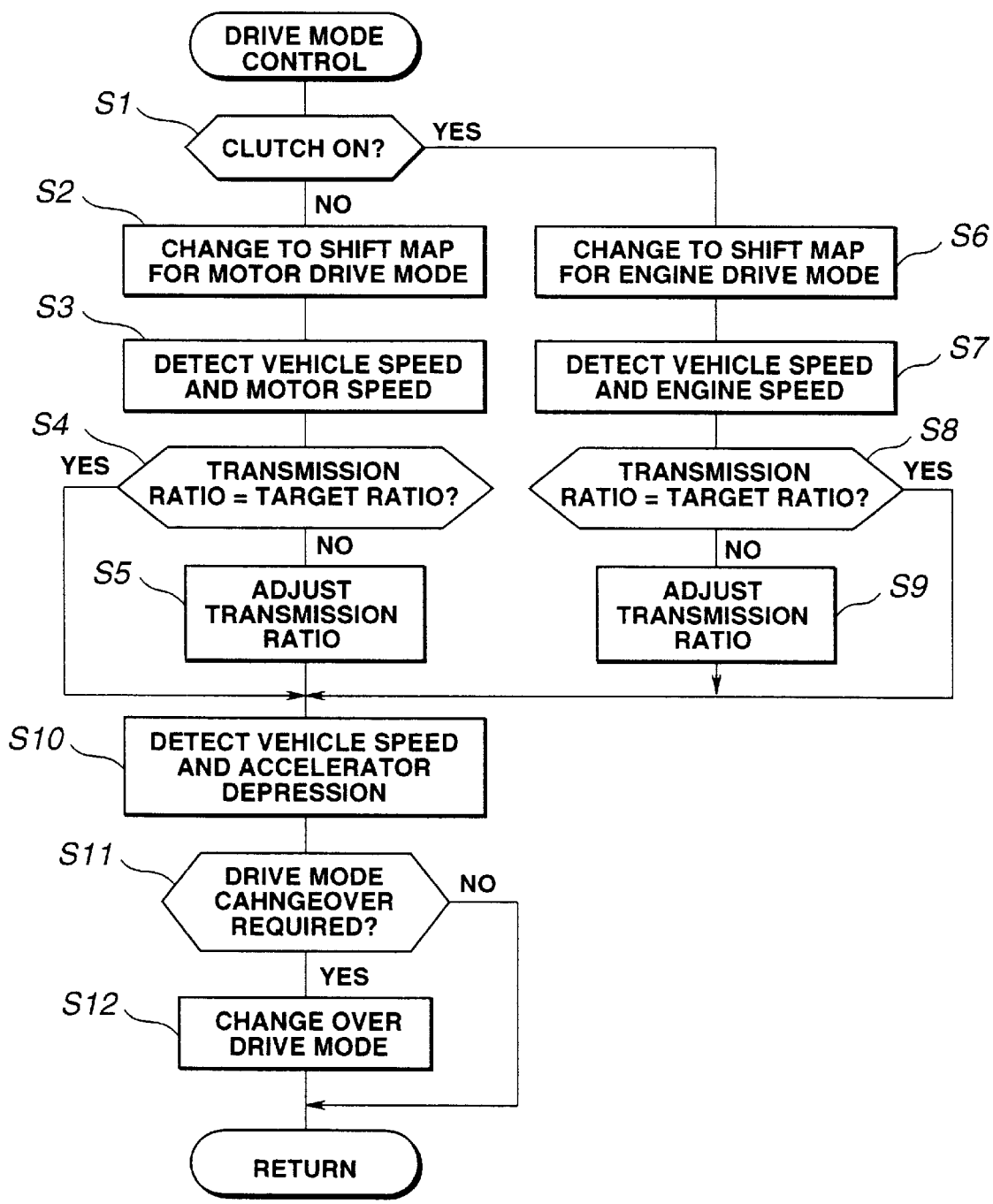
FIG. 19 is a flow chart showing a drive mode control process of the control system of FIGS. 1 and 2.

FIG. 19 shows a drive mode control process according to this embodiment. The controller 16 performs this control program at regular time intervals.

At a step S1, the controller 16 determines whether the clutch 3 is engaged or disengaged. In this example, the controller controls the clutch 3 by supplying a clutch control signal (or energizing current) to the clutch, and detects the engaged or disengaged condition of the clutch 3 by monitoring the clutch control signal supplied to the clutch 3. The controller 16 performs the transmission ratio control in the motor drive mode by taking a course of steps S2~S5 when the clutch 3 is disengaged, and performs the transmission ratio control in the engine drive mode by taking a course of steps S6~S9 when the clutch 3 is engaged.

In the motor drive mode with the clutch 3 released, the controller 16 proceeds to the step S2, and changes over the transmission shift map for the CVT 5 to a motor drive mode shift map which sets the transmission ratio on the higher ratio side in FIG. 14. Then, the controller 16 proceeds to the step S3 and determines the sensed current vehicle speed V and the sensed current motor speed Nm of the motor 4. At the step S4, the controller 16 determines whether the actual transmission ratio is equal to a target ratio or not, in accordance with the vehicle speed V and the motor speed Nm. If the actual transmission ratio is not equal to the target, then the controller 16 proceeds to the step S5 and varies the actual transmission ratio so as to reduce the deviation.

In the engine drive mode with the clutch 3 engaged, the controller 16 proceeds to the step S6, and changes over the transmission shift map for the CVT 5 to an engine drive mode shift map which sets the transmission ratio on the lower ratio side in FIG. 14. Then, the controller 16 proceeds to the step S7 and determines the sensed current vehicle speed V and the sensed current engine speed Ne of the engine 2. At the next step S8, the controller 16 determines whether the actual transmission ratio is equal to a target ratio or not, in accordance with the vehicle speed V and the engine speed Ne. If the actual transmission ratio is not equal to the target, then the controller 16 proceeds to the step S9 and varies the actual transmission ratio so as to reduce the deviation of the actual transmission ratio from the target ratio.

At a step S10 following the shift control program section, the controller 16 determines the sensed vehicle speed V and the sensed accelerator pedal depression degree θ. At a step S11, the controller 16 determines whether the vehicle drive mode should be changed over or not, by using the map of FIG. 13 for judging the clutch engagement. If the vehicle drive mode should be changed over, the controller 15 engages or disengages the clutch 3 at a step S12.

In the illustrated embodiment, the transmission ratio is set higher when the clutch is disengaged than when the clutch is engaged. However, it is optional to make the transmission ratio of the continuously variable transmission higher when the motor output is greater than the engine output than when the engine output is greater than the motor output. In each of the engine and motor, the maximum torque varies in accordance with the revolution speed, so that its output range varies in accordance with the revolution speed. In a lower revolution speed region, the output range of the motor is higher than the output range of the engine. Therefore, in the lower revolution speed region, the control system in this modified example uses the motor 4 as a primary propulsion source for normally driving the vehicle and sets the transmission ratio higher. The engine 2 is used as a secondary propulsion source for assisting the primary propulsion source by supplying propulsive energy when the primary source is not in a normal condition or when the driver's acceleration demand is great. In a higher revolution speed region, the engine 2 is used as the primary propulsion source, the motor 4 is used as the secondary propulsion source to assist the engine 2 in the case of the accelerator pedal being depressed deep, and the transmission ratio is set lower.

Alternatively, the controller may set the transmission ratio higher in the drive mode for driving the vehicle with the driving force of the motor than in the drive mode for driving the vehicle with the driving force of the engine.

According to the illustrated embodiment, the transmission ratio is set higher in a first vehicle operating region and lower in a second vehicle operating region (such as the blank region shown in FIG. 13). The transmission ratio is proportional to the ratio (engine speed/vehicle speed.) of the engine speed to the vehicle speed. The controller varies the target transmission ratio in accordance with a driver's accelerator demand (or driver's accelerator input). The control system sets the transmission ratio in the first operating region higher than the transmission ratio in the second operating region so that the transmission ratio in the first operating region under a given condition (of a given vehicle speed and a given accelerator input, for example) is higher than the transmission ratio in the second operating region under the same given condition.

The entire contents of a Japanese Patent Application No. 10(1998)-72387 (filed on Mar. 20, 1998) are incorporated herein by reference.

Although the invention has been described above by reference to one or more embodiments of the invention, the invention is not limited to the embodiments described above. Modifications and variations of the embodiments described above will occur to those skilled in the art in light of the above teachings.

What is claimed is:

1. A hybrid drive control system for a hybrid vehicle, the hybrid drive control system comprising:

a hybrid propulsion system comprising an internal combustion engine, an electric motor, a clutch which comprises an input member connected with the engine and an output member connected with the motor, and a continuously variable transmission which comprises an input member connected with the output member of the clutch and an output member for delivering a driving force to a drive axle of the vehicle; and a controller setting a transmission ratio of the continuously variable transmission higher when the clutch is disengaged than when the clutch is engaged.

2. The hybrid drive control system as claimed in claim 1 wherein the controller decreases the transmission ratio of the continuously variable transmission gradually after the clutch is engaged.

3. The hybrid drive control system as claimed in claim 2 wherein the controller controls the transmission ratio of the continuously variable transmission according to a shift control map which is set in a first form when the clutch is disengaged and in a second form when the clutch is engaged, and the controller decreases the transmission ratio of the continuously variable transmission by changing over the shift control map from the first form to the second form when the clutch is changed from a disengaged state to an engaged state.

4. A hybrid drive control system for a hybrid vehicle, the hybrid drive control system comprising:

a parallel hybrid propulsion system comprising an electric motor, an internal combustion engine and a variable speed transmission comprising an input member connected with the motor and the engine and an output member delivering an axle driving torque to drive the hybrid vehicle;

a vehicle operating condition sensor sensing a vehicle operating condition; and a controller discriminating a first vehicle operating region and a second vehicle operating region by monitoring the vehicle operating condition, setting the hybrid propulsion system in a first drive mode for driving the vehicle with the motor in the first vehicle operating region and in a second drive mode for driving the vehicle with the engine in the second vehicle operating region, and further setting a transmission ratio of the transmission higher in the first vehicle operating region than in the second vehicle operating region, and wherein the controller decreases the transmission ratio of the transmission gradually after a vehicle drive mode of the hybrid vehicle is switched from the first drive mode to the second drive mode.

5. The hybrid drive control system as claimed in claim 4 wherein the parallel hybrid propulsion system further comprises a clutch comprising an input member connected with the engine and an output member connected with the motor and the input member of the transmission, the variable speed transmission is a continuously variable transmission, the transmission ratio is a speed ratio of an input speed to an output speed of the transmission, and the controller sets the transmission ratio of the transmission higher in the first drive mode than in the second drive mode.

6. The hybrid drive control system as claimed in claim 5 wherein the first drive mode is a drive mode in which the clutch is disengaged, and the second drive mode is a drive mode in which the clutch is engaged.

7. The hybrid drive control system as claimed in claim 5 wherein the first drive mode is a drive mode in which the vehicle is propelled only by the driving force of the motor, and the second drive mode is a drive mode in which the vehicle is propelled only by a driving force of the engine.

8. A hybrid drive control system for a hybrid vehicle, the hybrid drive control system comprising:

a parallel hybrid propulsion system comprising an electric motor, an internal combustion engine and a variable speed transmission comprising an input member connected with the motor and the engine and an output member delivering an axle driving torque to drive the hybrid vehicle;

a vehicle operating condition sensor sensing a vehicle operating condition; and a controller discriminating a first vehicle operating region and a second vehicle operating region by monitoring the vehicle operating condition, setting the hybrid propulsion system in a first drive mode for driving the vehicle with the motor in the first vehicle operating region and in a second drive mode for driving the vehicle with the engine in the second vehicle operating region, and further setting a transmission ratio of the transmission higher in the first vehicle operating region than in the second vehicle operating region;

wherein the parallel hybrid propulsion system further comprises a clutch comprising an input member connected with the engine and an output member connected with the motor and the input member of the transmission, the variable speed transmission is a continuously variable transmission, the transmission ratio is a speed ratio of an input speed to an output speed of the transmission, and the controller sets the transmission ratio of the transmission higher in the first drive mode than in the second drive mode; and wherein the controller comprises:

a first section for detecting a predetermined condition by monitoring the vehicle operating condition;

a second section for operating the hybrid propulsion system in a vehicle drive mode which is set to the first drive mode for driving the vehicle with a driving force of the motor when the predetermined condition is not detected and to the second drive mode for driving the vehicle with a driving force of the engine when the predetermined condition is detected; and a third section for decreasing the transmission ratio of the transmission when the vehicle drive mode is changed from the first drive mode to the second drive mode.

9. The hybrid drive control system as claimed in claim 8 wherein the vehicle operating condition sensor comprises a first sensor for sensing the vehicle operating condition which is a first operating condition and a second sensor for sensing a second vehicle operating condition, and the third section comprises a first subsection for setting a shift control map to a first shift map when the vehicle drive mode is set to the first drive mode, and to a second shift map when the vehicle drive mode is set to the second drive mode, a second subsection for determining a target transmission ratio in dependence on the second vehicle operating condition according to the shift control map and a third subsection for controlling an actual transmission ratio of the continuously variable transmission to the target transmission ratio.

10. A hybrid drive control system for a hybrid vehicle, the hybrid drive control system comprising:

a parallel hybrid propulsion system comprising an electric motor, an internal combustion engine and a variable speed transmission comprising an input member connected with the motor and the engine and an output member delivering an axle driving torque to drive the hybrid vehicle;

a vehicle operating condition sensor sensing a vehicle operating condition; and a controller discriminating a first vehicle operating region and a second vehicle operating region by monitoring the vehicle operating condition, setting the hybrid propulsion system in a first drive mode for driving the vehicle with the motor in the first vehicle operating region and in a second drive mode for driving the vehicle with the engine in the second vehicle operating region, and further setting a transmission ratio of the transmission higher in the first vehicle operating region than in the second vehicle operating region, and wherein the first operating region is a region in which an output of the motor is greater than an output of the engine, and the second operating region is a region in which the output of the engine is greater than the output of the motor.

11. The hybrid drive control system as claimed in claim 10 wherein the controller decreases the transmission ratio of the transmission gradually after the output of the engine becomes greater than the output of the motor.

12. A hybrid drive control system for a hybrid vehicle, the hybrid drive control system comprising:

a parallel hybrid propulsion system comprising an electric motor, an internal combustion engine and a variable speed transmission comprising an input member connected with the motor and the engine and an output member delivering an axle driving torque to drive the hybrid vehicle;

a vehicle operating condition sensor sensing a vehicle operating condition; and a controller discriminating a first vehicle operating region and a second vehicle operating region by monitoring the vehicle operating condition, setting the hybrid propulsion system in a first drive mode for driving the vehicle with the motor in the first vehicle operating region and in a second drive mode for driving the vehicle with the engine in the second vehicle operating region, and further setting a transmission ratio of the transmission higher in the first vehicle operating region than in the second vehicle operating region; and wherein the sensor comprises a revolution sensor for sensing a source speed which is one of a motor speed of the motor and an engine speed of the engine, the first operating region is a region in which the source speed is lower than a predetermined speed, and the second operating region is a region in which the source speed is greater than the predetermined speed.

13. A hybrid drive control method for a parallel hybrid propulsion system comprising an electric motor, an internal combustion engine and a variable speed transmission comprising an input member connected with the motor and the engine and an output member delivering an axle driving torque to drive a hybrid vehicle, the control method comprising:

sensing a vehicle operating condition;

discriminating a first vehicle operating region and a second vehicle operating region by monitoring the vehicle operating condition;

operating the parallel hybrid propulsion system in a first drive mode for driving the vehicle with the motor in the first vehicle operating region and in a second drive mode for driving the vehicle with the engine in the second vehicle operating region; and setting a transmission ratio of the transmission higher in the first vehicle operating region than in the second vehicle operating region; and wherein the first operating region is a region in which an output of the motor is greater than an output of the engine and the second operating region is a region in which the output of the engine is greater than the output of the motor.

14. A hybrid drive control method for a parallel hybrid propulsion system comprising an electric motor, an internal combustion engine and a variable speed transmission comprising an input member connected with the motor and the engine and an output member delivering an axle driving torque to drive a hybrid vehicle, the control method comprising:

sensing a vehicle operating condition;

discriminating a first vehicle operating region and a second vehicle operating region by monitoring the vehicle operating condition;

operating the parallel hybrid propulsion system in a first drive mode for driving the vehicle with the motor in the first vehicle operating region and in a second drive mode for driving the vehicle with the engine in the second vehicle operating region; and setting a transmission ratio of the transmission higher in the first vehicle operating region than in the second vehicle operating region; and wherein the step of setting the transmission ratio comprises an operation of decreasing the transmission ratio of the continuously variable transmission when a vehicle drive mode is changed from the first drive mode to the second drive mode.

15. A hybrid drive control system for a hybrid vehicle, the hybrid drive control system comprising;

first energy supplying means for supplying mechanical energy to propel a hybrid vehicle by converting electrical energy into the mechanical energy;

second energy supplying means for supplying mechanical energy to propel the hybrid vehicle by converting energy of fuel into the mechanical energy;

changing means for changing over a vehicle drive mode between a first drive mode for propelling the vehicle with the mechanical energy supplied from the first energy supplying means and a second drive mode for propelling the vehicle with the mechanical energy supplied from the second energy supplying means;

speed varying means for receiving an input rotation from one of the first and second energy supplying means, for delivering an output rotation for driving the vehicle, and for continuously varying a transmission ratio of an input speed of the input rotation to an output speed of the output rotation;

monitoring means for monitoring a first vehicle operating parameter to detect a predetermined condition;

setting means for setting the changing means in a first state for achieving the first drive mode when the predetermined condition is not detected and in a second state for achieving the second drive mode when the predetermined condition is detected, and decreasing means for decreasing the transmission ratio of the speed varying means when the vehicle drive mode is changed from the first drive mode to the second drive mode.

16. A hybrid drive control system for a hybrid vehicle, the hybrid drive control system comprising:

a parallel hybrid propulsion system comprising an internal combustion engine, an electric motor, a clutch comprising an input member connected with the engine, and an output member connected with the motor, a continuously variable transmission comprising an input member connected with the output member of the clutch;

a sensor for sensing a vehicle operating condition; and a controller for discriminating a first vehicle operating region and a second vehicle operating region by monitoring the vehicle operating condition, for controlling the parallel hybrid propulsion system in a first operating mode using the motor as a primary propulsion source for normally driving the vehicle in the first vehicle operating region and in a second operating mode using the engine as the primary propulsion source in the second vehicle operating region and for controlling an actual transmission ratio of the continuously variable transmission to a first target transmission ratio in the first operating mode, and to a second target transmission ratio which is lower than the first target transmission ratio in the second operating mode; and wherein the sensor comprises a revolution sensor for sensing a source speed which is one of a motor speed of the motor and an engine speed of the engine, the first operating region is a region in which the source speed is lower than a predetermined speed, and the second operating region is a region in which the source speed is greater than the predetermined speed.

* * * * *